(12) United States Patent
Marcus et al.

(10) Patent No.: US 11,687,965 B2
(45) Date of Patent: Jun. 27, 2023

(54) METHODS, SYSTEMS, AND COMPUTER-READABLE MEDIA FOR DETERMINING OUTCOMES FOR PROMOTIONS

(71) Applicant: FreeWheel Media, Inc., Philadelphia, PA (US)

(72) Inventors: Claudio Marcus, Andover, NH (US); Seth Haberman, New York, NY (US)

(73) Assignee: FreeWheel Media, Inc., Philadelphia, PA (US)

( * ) Notice: Subject to any disclaimer, the term of this patent is extended or adjusted under 35 U.S.C. 154(b) by 0 days.

(21) Appl. No.: 14/732,301

(22) Filed: Jun. 5, 2015

(65) Prior Publication Data
US 2015/0373394 A1    Dec. 24, 2015

Related U.S. Application Data

(60) Provisional application No. 62/008,056, filed on Jun. 5, 2014.

(51) Int. Cl.
*G06Q 30/0242*     (2023.01)
*H04N 21/81*        (2011.01)
*H04N 21/258*       (2011.01)

(52) U.S. Cl.
CPC ... *G06Q 30/0242* (2013.01); *H04N 21/25883* (2013.01); *H04N 21/812* (2013.01); *H04N 21/8153* (2013.01)

(58) Field of Classification Search
CPC ............... H04N 21/435; H04N 21/812; H04N 21/25883; H04N 21/8153; G06Q 30/0242
(Continued)

(56) References Cited

U.S. PATENT DOCUMENTS 6,698,020 B1   2/2004 Zigmond et al.
2001/0020236 A1   9/2001 Cannon
(Continued)

FOREIGN PATENT DOCUMENTS

JP    2002-506328 A    2/2002
JP    2002-518946 A    6/2002
(Continued)

OTHER PUBLICATIONS

International Search Report and Written Opinion dated Sep. 15, 2015, from corresponding International Application No. PCT/US15/34520, International Filing Date Jun. 5, 2015.
(Continued)

*Primary Examiner* — Nasser M Goodarzi
*Assistant Examiner* — Jaycee Imperial
(74) *Attorney, Agent, or Firm* — BakerHostetler (57) ABSTRACT

Systems and methods for determining outcomes for promotional messages presented to viewers using digital on-screen graphics are described. A service provider may present digital on-screen graphics on content presentation devices, which may be detected by an outcome management system. The digital on-screen graphic may be displayed in association with a primary content offering, such as a television program. The outcome management system may monitor content presentation devices, including those exposed to the digital on-screen graphic, to determine the effectiveness of the digital on-screen graphic. For instance, the outcome management system may determine whether content presentation devices exposed to the digital on-screen graphic subsequently accessed a content offering promoted therein.

20 Claims, 4 Drawing Sheets

(58) Field of Classification Search
USPC .......................................................... 725/32
See application file for complete search history.

(56) References Cited

U.S. PATENT DOCUMENTS

| | | | |
|---|---|---|---|
| 2007/0183430 A1 | 8/2007 | Asmussen | |
| 2007/0255621 A1* | 11/2007 | Mason | G06Q 30/0243 705/14.54 |
| 2008/0046918 A1* | 2/2008 | Carmi | H04N 7/10 725/32 |
| 2008/0109307 A1* | 5/2008 | Ullah | G06Q 30/02 705/14.66 |
| 2008/0133342 A1* | 6/2008 | Criou | G06Q 30/02 705/14.41 |
| 2008/0215418 A1* | 9/2008 | Kolve | G06Q 30/0201 705/7.29 |
| 2008/0250447 A1* | 10/2008 | Rowe | G06Q 30/02 725/32 |
| 2009/0328113 A1* | 12/2009 | van de Klashorst | G06Q 30/00 725/87 |
| 2010/0030647 A1* | 2/2010 | Shahshahani | G06Q 30/0269 705/14.66 |
| 2010/0153217 A1* | 6/2010 | Kirkby | G06Q 10/10 705/14.71 |
| 2010/0306043 A1* | 12/2010 | Lindsay | G06Q 30/02 705/14.41 |
| 2011/0078726 A1* | 3/2011 | Rosenberg | G06Q 30/02 725/34 |
| 2013/0305273 A1* | 11/2013 | Hadfield | H04N 21/44204 725/14 |
| 2014/0109123 A1* | 4/2014 | Balakrishnan | H04N 21/44222 725/14 |
| 2014/0229967 A1* | 8/2014 | Thomas | G06Q 30/02 725/14 |
| 2014/0282670 A1* | 9/2014 | Sinha | H04H 60/40 725/19 |
| 2014/0351835 A1* | 11/2014 | Orlowski | H04N 21/44204 725/9 |
| 2015/0067714 A1* | 3/2015 | Bhogal | H04N 21/812 725/25 |

FOREIGN PATENT DOCUMENTS

| | | |
|---|---|---|
| JP | 2010-056751 A | 3/2010 |
| JP | 2011-508319 A | 3/2011 |
| WO | WO 2014/015330 A1 | 1/2014 |

OTHER PUBLICATIONS

Anonymous, "Automated Content Recognition—creating content aware ecosystems", CSI Magazine, Sep. 1, 2012, 1-16.

* cited by examiner

FIG. 4

METHODS, SYSTEMS, AND COMPUTER-READABLE MEDIA FOR DETERMINING OUTCOMES FOR PROMOTIONS

CROSS-REFERENCE TO RELATED APPLICATIONS

This application claims the benefit of U.S. Provisional Application No. 62/008,056, entitled "Method and System to Measure the Effectiveness of TV Program Promotion Products" and filed on Jun. 5, 2014, the contents of which are incorporated by reference in their entireties as if fully set forth herein.

FIELD OF INVENTION

The present invention generally relates to determining the effectiveness of the distribution of content to consumers and, more specifically, to determining the effectiveness of advertisements or other promotions presented using digital on-screen graphics on content presentation devices, such as a television.

BACKGROUND

The use of digital on-screen graphics have experienced widespread adoption and use by media network operators. A typical digital on-screen graphic includes a digital graphical element embedded in or overlaid on a main content offering, such as a television program (commonly referred to as a "bug"). Initially, digital on-screen graphics were used by broadcast television network providers to identify the particular network. For example, broadcast television networks may include a digital on-screen graphic in the form of symbol or name of the network overlaid over a portion of the main content offering, such as the portion displayed on the lower-right corner of a television screen. Eventually, digital on-screen graphics evolved to include promotional content, animated graphics, and video.

In general, such digital on-screen graphics represent a form of permanent visual identification that aims to increase brand recognition of the networks and their programming. Digital on-screen graphics are generally displayed within the context of the programming and also operate to identify the source of programming and promoted programs even when the content is viewed on a time-shifted basis, such as content recorded using a personal video recorder (for example, a PVR or DVR).

Content providers and media network operators use digital on-screen graphics to present advertisements and program promotion advertising to promote available programming. A challenge for advertisers, such as program promotion advertisers, is measuring the effectiveness of the advertisements. According to conventional technology, effectiveness may only be determined based on sampling data and test groups. This is an inefficient and error-prone process. As such, program promotion advertisers are not able to accurately realize the effect of their advertisements on content viewers. In this type of environment, content providers and media network operators are not able to take advantage of successful advertising and promotional efforts implemented using digital on-screen graphics or avoid ineffective digital on-screen graphic advertisements that do not persuade viewers to watch the promoted programs, purchase products, or the like. Accordingly, it would be beneficial to provide a method for determining the outcome of a digital on-screen graphic-based program promotion or other type of advertising campaign in an automated, efficient manner that is able to, among other things, capture which advertisements are watched by which viewers and compare this information with which programs are watched by the same viewers and/or which products are purchased by consumers.

SUMMARY

This disclosure is not limited to the particular systems, devices and methods described, as these may vary. The terminology used in the description is for the purpose of describing the particular versions or embodiments only, and is not intended to limit the scope.

In an embodiment, a system for determining at least one outcome of at least one digital on-screen graphic promoting at least one promoted content offering may include a processor and a non-transitory, computer-readable storage medium in operable communication with the processor. The computer-readable storage medium may contain one or more programming instructions that, when executed, cause the processor to receive graphic information associated with the at least one digital on-screen graphic, the graphic information including promoted content information indicating the at least one promoted content offering being promoted via the at least one digital on-screen graphic, receive graphic presentation information indicating a presentation of the at least one digital on-screen graphic on at least one content presentation device, receive post-presentation information indicating content offerings presented via the at least one content presentation device following the presentation of the at least one digital on-screen graphic, generate outcome information based on the post-presentation information, the outcome information indicating whether the at least one promoted content offering is included in the content offerings, and determine the at least one outcome based on the outcome information.

In an embodiment, a computer-implemented method for determining at least one outcome of at least one digital on-screen graphic promoting at least one promoted content offering may include, by a processor receiving graphic information associated with the at least one digital on-screen graphic, the graphic information including promoted content information indicating the at least one promoted content offering being promoted via the at least one digital on-screen graphic, receiving graphic presentation information indicating a presentation of the at least one digital on-screen graphic on at least one content presentation device, receiving post-presentation information indicating content offerings presented via the at least one content presentation device following the presentation of the at least one digital on-screen graphic, generating outcome information based on the post-presentation information, the outcome information indicating whether the at least one promoted content offering is included in the content offerings, and determining the at least one outcome based on the outcome information.

In an embodiment, a computer-readable storage medium having computer-readable program code configured to determine at least one outcome of at least one digital on-screen graphic promoting at least one promoted content offering may include computer-readable program code configured to receive graphic information associated with the at least one digital on-screen graphic, the graphic information including promoted content information indicating the at least one promoted content offering being promoted via the at least one digital on-screen graphic, computer-readable program code configured to receive graphic presentation information indicating a presentation of the at least one digital on-screen graphic on at least one content presentation device, computer-readable program code configured to receive post-presentation information indicating content offerings presented via the at least one content presentation device following the presentation of the at least one digital on-screen graphic, computer-readable program code configured to generate outcome information based on the post-presentation information, the outcome information indicating whether the at least one promoted content offering is included in the content offerings, computer-readable program code configured to determine the at least one outcome based on the outcome information.

DETAILED DESCRIPTION

In this disclosure, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, a system, and/or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise. As used in this document, the term "comprising" means "including, but not limited to."

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise.

It should be understood that the order of steps or order for performing certain actions is immaterial so long as the present teachings remain operable. Moreover, two or more steps or actions may be conducted simultaneously.

The terminology used in the description is for the purpose of describing the particular versions or embodiments only, and is not intended to limit the scope.

The described technology generally relates to systems, methods, and computer readable media for determining outcomes for promotional messages presented to viewers using digital on-screen graphics. A digital on-screen graphic may generally include any type of graphical object that may be embedded in, overlaid over, or otherwise displayed with a primary content offering. For example, a digital on-screen graphic may include a symbol of a broadcast network overlaid over a portion of a broadcasted television program (i.e., the primary content offering) (commonly referred to as a "bug"). In another example, a digital on-screen graphic may include a banner displayed over a portion of the television screen during a presentation of a television program, movie, or other content offering. The digital on-screen graphic may include various forms of content (or "graphical elements"), including, without limitation, video, animation, text, pictures, audio, and any combination thereof. The digital on-screen graphic may be embedded in, overlaid over, displayed in, or otherwise presented in combination with the primary content offering using techniques known to those having ordinary skill in the art. For instance, the digital on-screen graphic may be formed as part of the television network play-out stream for the primary content offering.

A promotional message may generally include an advertisement or other marketing messaging promoting a product, service, content, or the like. In some embodiments, a promotion message may be an advertisement configured to promote one or more content components, such as a television program, a website, a radio station, or the like (a "content promotional message"). In some embodiments, one or more promotional messages may be presented using a digital on-screen graphic ("promotional graphic").

In some embodiments, a promotion outcome management system ("outcome management system") may be configured to monitor promotional graphics and viewer interaction with the subject of the associated promotion, such as a product, service, or content ("promotion subject"). In some embodiments, a promotional graphic may include a targeted promotional graphic targeted specifically for one or more segments of available content presentation devices based on one or more characteristics associated therewith.

The outcome management system may be configured to, among other things, execute a promotion outcome management application ("outcome management application" configured to perform various functions described according to some embodiments herein to determine the outcome of promotional graphics and/or to process and/or report information relating thereto. In some embodiments, the management application may generate, receive, or otherwise access graphic information associated with a promotional graphic, including information relating to the promotion subject that is being promoted via the promotional graphic. In some embodiments, the management application may generate, receive, or otherwise access graphic presentation information indicating whether a promotional graphic has been presented on a content presentation device, as well as any related contextual information, such as time of the presentation, the primary content offering, other content offerings consumed, or the like. The graphic presentation information may include impression records having various record elements relating to presentation of a promotional graphic and/or the primary content offering. Illustrative and non-restrictive examples of record elements include a device identifier, date and time indicators, a content identifier of the primary content offering, a network element configured to indicate which network the content presentation device belongs to, an owner element configured to indicate an owner, subscriber, or the like associated with the content presentation device and/or media network account, metadata, and any other type of record element that may be used according to embodiments provided herein.

In some embodiments, the management application may generate, receive, or otherwise access post-presentation information indicating content offerings presented on a content presentation device following the presentation ("exposure") of a promotional graphic. In some embodiments, the post-presentation information may be used to generate outcome information indicating whether a viewer watched or otherwise interacted with (for instance, recorded using a DVR, streamed via VOD on the same or a different device, or the like) a content offering that was the promotion subject of a promotional graphic accessed by the content presentation device.

In some embodiments, the management application may generate and/or receive target information associated with an audience and/or content presentation devices thereof that includes data about the audience, such as demographic information, content interaction preferences and/or history (i.e., television content viewing history), or the like. In some embodiments, the graphic management application may be executed by the outcome management system, content presentation devices, and/or computing devices associated with a service provider and/or content originator.

Although advertisers and advertising content may be used in examples in this disclosure, embodiments are not so limited, as any type and form of content capable of operating according to embodiments is contemplated herein. In addition, although content promotion subjects are used as illustrative examples herein, embodiments are not so limited, as any promotion subject, such as a product or service, that may be used according to some embodiments is contemplated herein.

Content may generally include any type of data, information, media, graphics, visible elements, or the like that may be expressed through a medium. Illustrative mediums may include visual mediums such as television, and broadcast, cable, satellite, and/or network (e.g., the Internet) or streaming forms thereof. Examples of content may include, but are not limited to, video, audio, movies, video games, television and radio programs, commercials, websites, images, photographs, text, electronic or digital documents, information feeds, streaming media, social media, social networks, and/or combinations thereof. In some embodiments, content may include an advertisement, such as a television advertisement or an online advertisement including, without limitation, website advertisements, Internet advertisements, search engine marketing (SEM), social media marketing, and mobile device advertising. A digital on-screen graphic may include content. For example, a digital on-screen graphic may be formed from graphic elements (i.e., pictures, images), video, text, or the like. In general, a digital on-screen graphic may include a particular form of content that is presented along with a primary content offering.

The content may be distributed or broadcast by a service provider to various content presentation devices, with or without digital on-screen graphics. A service provider may generally include any type of entity or structure capable of providing content assets to a content presentation device. For instance, the service provider may include a media network operator, a television broadcast network, a cable television network, a satellite television network, an internet service provider (ISP), a computing device advertising network, a media distribution network, a cloud computing network, a local area network (LAN), a wide area network (WAN), a terrestrial network, a mobile network, and/or any combination thereof. Television networks may include standard definition (SD) and high definition (HD) networks.

In some embodiments, the outcome management system may be configured to operate across physical device platforms, networks, and/or service providers simultaneously. For example, content and digital on-screen graphics may be managed by the outcome management system in association with set-top-boxes over a cable television system, mobile computing devices using standard network communication protocols (for instance, Ethernet or Wi-Fi) over an Internet service provider network, and/or to smart phone devices or other mobile computing devices over standard telecommunication protocols (for instance, 3G, 4G, LTE, or the like).

A content presentation device may generally include any device now known to those having ordinary skill in the art or developed in the future that is capable of presenting content to a viewer or other type of content consumer. Non-limiting examples of content presentation devices include televisions, smart televisions, laptops, personal digital assistants (PDAs), tablet computing devices, smartphones, personal computers (PCs), display monitors or terminals, radios, audio devices, speakers, headphones, haptic devices, electronic reading devices ("e-readers"), light emitting diode (LED) devices, organic LED (OLED) devices, wearable screens, set-top-boxes, satellite receivers, video-on-demand (VOD) receivers, content receivers (e.g., Apple TV® manufactured by Apple Inc. of Cupertino, Calif., United States; Roku® manufactured by Roku, Inc. of Saratoga, Calif., United States), digital video recorders (DVRs), personal video recorders (PVRs), hard drives, flash drives, storage servers, digital video disc (DVD) devices, Blu-ray™ devices, or the like. A recipient, viewer, audience member, or the like may generally include an individual viewing, watching, listening to, consuming, recording, streaming, or otherwise interacting with content using a content presentation device.

A content originator may include any entity capable of providing content and/or digital on-screen graphics. A content originator may include any type of content developer known to those having ordinary skill in the art, such as an advertiser, an advertising agency, a television studio or broadcast network, a radio channel, a website provider, a VOD service, a content storage and delivery service, or the like.

In some embodiments, a content originator may generate campaign information relating to an advertising schedule or campaign, campaign goals, and/or campaign restraints. A campaign may generally refer to one or more content presentations (e.g., "creatives") related to a particular product, service, content offering, and/or generally related by a common idea or theme. For instance, an advertiser may define a target audience along with a target level of viewership over a specified period of time. In addition, an advertiser may set constraints against where or when their advertisement content assets may be distributed (or "play out"). For example, an advertiser may not want an advertisement to play out on children's networks, overnight, or in a specific market or zone. An advertiser may be an external advertiser or may be a service provider promoting programming or other products. Goals may be defined using various types of goals known in the art, such as a target number of impressions against a specific audience (for example, 1,000,000 impressions from adults age 18-49) for a specific time period (for example, a campaign set to run over a two-week period). Goals may be stated in terms of measurable viewership metrics that can be used as collected to adjust goals over the course of the campaign. In an example having a 1,000,000 impressions goal over a two-week campaign, if after the first week, 200,000 impressions had been delivered, the goal for the second week would be 800,000 impressions.

In some embodiments, the outcome management system may enable the measurement of the effectiveness of digital on-screen graphics based on the detection of device-level exposure of promotional messages within network programming video content, independent of the content on the device being viewed live or in time-shifted mode (such as when viewing via VOD or a PVR). The capture of necessary information regarding the digital on-screen graphics used to promote specific programs, a log file derived from an integrated play-out system used by the television network may be accessed and parsed to obtain relevant graphic information, including metadata indicating the type of digital on-screen graphic, the name or other identifier of the digital on-screen graphic, the related program being promoted, the network and program in which the digital on-screen graphic was embedded for play-out, play-out date and time(s) associated with the use of the digital on-screen graphic, or the like. In some embodiments, graphic information or other metadata may be accessed from the play-out system or a third-party programming data source, such as from Tribune Media Services (TMS), which may include the genre(s) of the program being promoted, the genre(s) of the program in which the digital on-screen graphic was embedded into play-out, or other information relating to the primary content offering associated with a promotional graphic.

In some embodiments, detection of device-level exposure of the digital on-screen graphics may include the outcome management system using automated content recognition of the underlying program and the timing of the digital on-screen graphic(s) relative to the related program timing on any individual device. The outcome management system may keep track of which content presentation devices were detected presenting the underlying program at the time of the digital on-screen graphic(s), which, for example, may be stored or used as graphic presentation information. The outcome management system may also use a device-level automated content recognition (ACR) of the promoted program to determine which devices viewed the promoted program.

In some embodiments, the outcome management system may perform, generate, receive, or otherwise access the results of one or more database queries, data matching and classification procedures, as well as various analytic calculations to generate outcome information including, without limitation, how many devices were exposed to any given promotional graphic and/or those related to the same program promotion campaign, how many times and the related timing that each device was exposed to the promotional graphic associated with any given program promotion campaign. In some embodiments, the management system may perform and/or receive the results of a series of analytic calculations that determine what proportion of the devices that detected viewing of the promoted program were exposed to promotional graphics for the related program promotion campaign, corresponding program viewing conversion rates for various subsets of types, frequencies and timing of exposure to digital on-screen graphics for the each program promotion campaign, and/or the like. In some embodiments, the management system may also perform and/or access the results of advanced forms of analytic procedures such as machine learning or attribution modeling to enable a deeper understanding of which combinations of exposures to digital on-screen graphics produced the most effective program viewing conversion rates. In some embodiments, the management system may operate to combine device-level information regarding exposure to program promotion advertising with device-level exposure of digital on-screen graphics to gain insights into the related impact on promoted program viewing.

In some embodiments, the management system may include and/or be embedded within a system that automatically delivers timely information regarding the relative effectiveness of using digital on-screen graphics to drive program viewing, either stand alone or in conjunction with the use of other forms of program promotion including, without limitation, on-screen, cross-channel, paid program promotion ads, digital, social, and other forms of related program promotion.

In some embodiments, the management system may be used with a variety of digital on-screen graphics used to promote program viewing, including but not limited to exposures on linear television viewing, time-shifted television viewing such as when using VOD and PVRs, as well as online video, for example, when viewing takes place on devices enabled with the ability to detect the exposure of digital on-screen graphics. For the purposes of describing some embodiments herein, linear television exposures of digital on-screen graphics may be used as one non-limiting example of promotional graphic exposure.

In some embodiments, the presentation of promotional graphics may involve the use of device-level viewing data associated with unique identifiers of the content presentation devices ("device identifiers"). In some embodiments, the device identifiers may include hashed, encrypted, or otherwise processed content process device identifiers. In this manner, the outcome management system may be able to target viewers and/or receive viewers without using any personally identifiable information (PII), for example, to ensure proper consumer-privacy compliance. Device-level viewing data may be used to identify and/or classify content presentation devices according to various characteristics, such as prior viewers of programs and genres within a time-frame, or even current viewers of a specific program or genre. For examples, a television that has tuned into sports-related programming may be classified as having an interest in sports. In another example, a mobile computing device used to stream on-demand video content relating to action movies may be classified as having an interest in action movies. In some embodiments, the device-level viewing data may be corresponded with service provider subscriber account or profile information to identify viewers (including anonymous identification), accounts, or the like.

In some embodiments, detection of device-level exposure of primary content offerings associated with the presentation of promotional graphics may include determining which content has been viewed by a content presentation device and matching that information with which content has been associated with digital on-screen graphics. In some embodiments, detection of device-level exposure of primary content offerings may be implemented using automated content recognition (ACR) of the underlying program and the related expected timing of the promotional graphic(s) relative to the related program timing on a content presentation device. In some embodiments, the expected timing associated with each presentation of a digital on-screen graphic may be derived from graphic presentation information provided by a service provider relating to the presentation of digital on-screen graphics. For example, the graphic presentation information may include an integrated play-out system log file that generates a record of all individual video and graphics that are composited to form part of a television network play-out stream.

In some embodiments using ACR, the detected automated content recognition of the program is used to determine the device-level timing relative to the expected on-screen distribution feed. Once the device-level timing for the program is determined, the expected timing of the digital on-screen graphic(s) may be used to determine whether a user has viewed a promotional graphic.

Although some embodiments may be configured to determine presented content offerings and/or promotional graphics using ACR features, embodiments are not so limited, as any technology capable of recognizing content and/or graphics according to some embodiments is contemplated herein. For instance, presentation of content offerings and/or promotional graphics may be determined based on clickstream information, such as clickstream information configured to track user activities on a television, set top box, computing device, or the like. The user activities may be tracked using various methods known to those having ordinary skill in the art, such as through logging key presses on a remote control, keyboard, and/or a computing device configured to operate a content playback device. According to some embodiments, content accessed through an Internet protocol (IP) platform, such as through a computing device and/or Smart TV, may use a pixel-based tracking application for tracking content promotion messages and/or content components. In some embodiments, program guide information, VOD information, metadata associated with the content, or the like may be used.

In some embodiments, a campaign management application may be used for defining, planning, and measuring campaigns involving targeted promotional graphics. The campaign management application may allow users, such as advertisers and marketers, to define viewer target segments based on past or present viewing behavior, as well as to associate specific targeted o graphic overlays to any given segment for a campaign, such as a program promotion campaign. The campaign management application may also deliver timely information regarding the relative effectiveness of using digital on-screen graphics to drive program viewing, either stand alone or in conjunction with the use of other forms of program promotion, including, without limitation, on-screen, cross-channel and paid program promotion ads and digital, social and other forms of related program promotion. In some embodiments, the campaign management application may be in communication with the management application. In some embodiments, the campaign management application is a component, module, program, or other element of the management application.

The methods and systems described according to some embodiments can be used with a variety of digital on-screen graphics used to promote program viewing, including but not limited to, exposures on linear television viewing, time-shifted television viewing via VOD and/or PVRs, online or streaming video using mobile computing devices, for example, when viewing takes place on devices enabled with the ability to detect the exposure of programming associated with digital on-screen graphics. Although linear television programming may be used in examples herein, embodiments are not so limited as any type of content presentation and/or consumption capable of operating according to some embodiments is contemplated herein.

Figure 1:
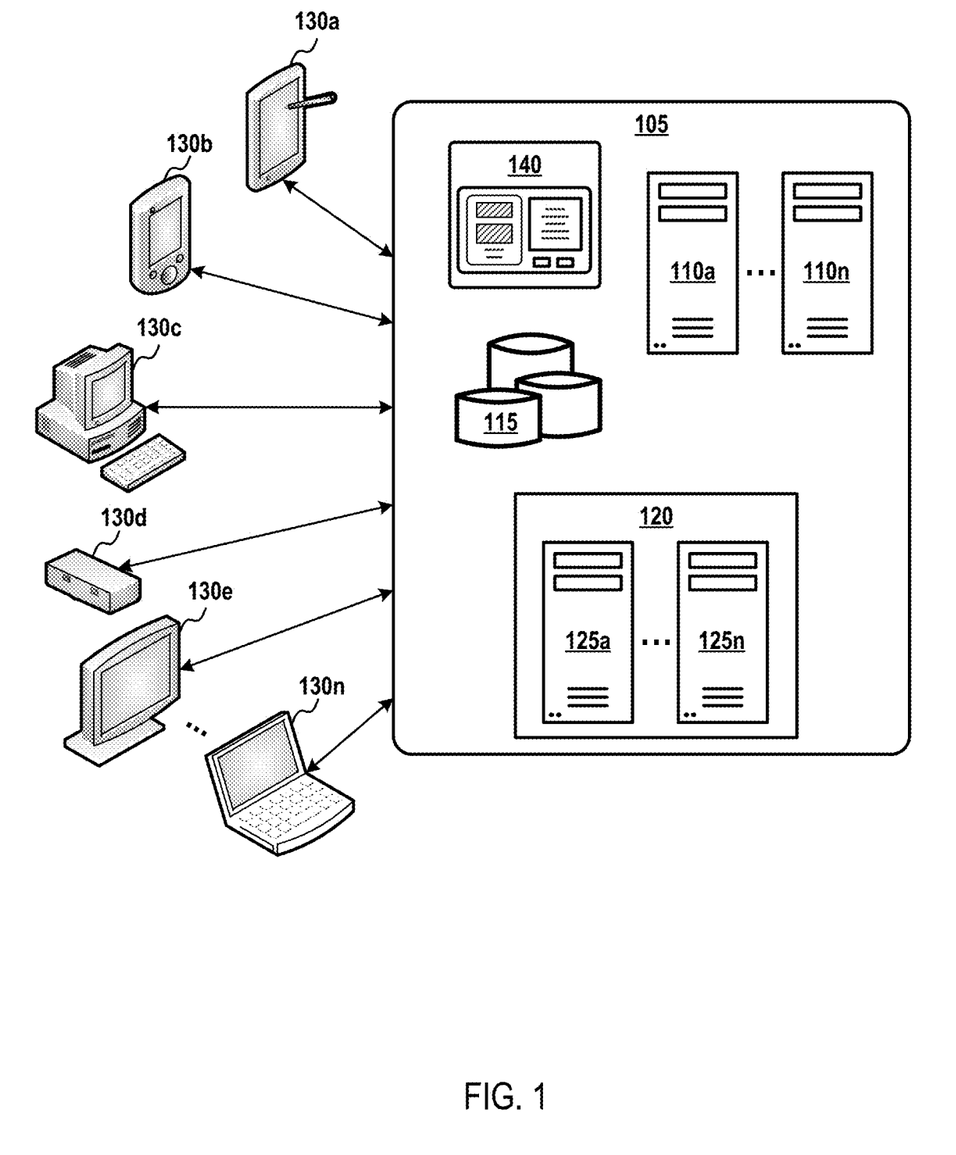
FIG. 1 depicts an illustrative outcome management system according to some embodiments.

FIG. 1 depicts an illustrative outcome management system according to some embodiments. As shown in FIG. 1, a service provider 105 may be configured to distribute content to various content presentation devices 130a-n. For example, the service provider 105 may be a cable television provider configured to distribute television programs and advertisements to subscriber set-top boxes 130d and/or televisions 130e and/or to stream VOD content to mobile computing devices 130a, 130n and smart phones 130b. The service provider 105 may include service provider computing devices 110a-n and may be in communication with service provider databases 115, which may include one or more of graphic information, graphic presentation information, post-presentation information, and/or outcome information. In some embodiments, the service provider databases 115 may include third-party databases, such as content databases and/or audience information.

The service provider 105 may be in communication with a content originator, such as an advertiser. In some embodiments, the service provider 105 may include and/or may be a content originator (for example, when promoting service provider 105 content). The content originator may transmit or otherwise make a promotional graphic 140 available to the service provider 105 for distribution to the content presentation devices 130a-n to be presented with a primary content offering, such as a television program.

In some embodiments, the service provider 105 may generate and/or provide the promotional graphic 140 based on campaign information for an advertising and/or promotional campaign. An outcome management system 120 may be in communication with the content provider 105 and may include management system computing devices 125a-n, such as server computing devices configured to store information and/or perform functions described according to some embodiments herein. Although the outcome management system 120 is depicted as being a component of the service provider 105 in FIG. 1, embodiments are not so limited, as the outcome management system may be a separate component. In some embodiments, the content presentation devices 130a-n may include and/or be an outcome management system 120, for example, executing the management application.

The outcome management system 120 may be configured to determine and/or receive graphic presentation information, for example, based on information received from and/or detected from the content presentation devices 120a-n and/or the service provider 105. For instance, the content presentation devices 120a-n and/or the server devices 110a-n, 125a-n may be configured to detect the content being presented thereon, such as through the use of ACR and/or by monitoring accessed content (for instance, using program guide information, VOD information, metadata associated with the content, or the like). The graphic information may include information associated with the promotional graphic, such as historical presentation information, future presentation information, associated primary content offerings, targeted device, target viewers, promotion subject, presentation frequency, insertion times, historical exposure rate, historical outcome information associated therewith, or the like.

The promotion graphic 140 may be presented to one or more of the content presentation devices 130a-n one or more times. The management application 120 may receive graphic presentation information indicating a presentation of the promotional graphic 140 at a content presentation device 130a-n. The graphic presentation information may also include presentation context, such as other content offerings accessed by the content presentation device 130a-n, exposure characteristics (i.e., frequency of exposure, order of exposure in relation to other promotional graphics), and the like. Post-presentation information may be generated by monitoring the activity of the content presentation devices 130a-n after exposure to the promotional graphic 140. The post-presentation information may include content offerings accessed by a content presentation device 130a-n following the presentation of one or more promotional graphics 140. The post-presentation information may also include any other information relating to activity of a content presentation device 130a-n and/or the service provider (i.e., change to program lineup, offering of new programs, modifications to advertising rates, duration, frequency, or the like), including duration and/or frequency of content consumption, genres of content consumption, activity of devices related to viewer, or the like.

The management application 120 may generate outcome information based on the post-presentation information and, for example, the graphic presentation information and/or the graphic information. The outcome information may indicate the effectiveness of the promotional graphic 140. For instance, the outcome information may indicate whether a viewer that accessed a promotional graphic 140 promoting program A watched program A. In another instance, the outcome information may indicate the rate at which viewers that were exposed to a promotional graphic 140 promoting program A actually watched, recorded, streamed, or otherwise interacted with program A.

Figure 2:
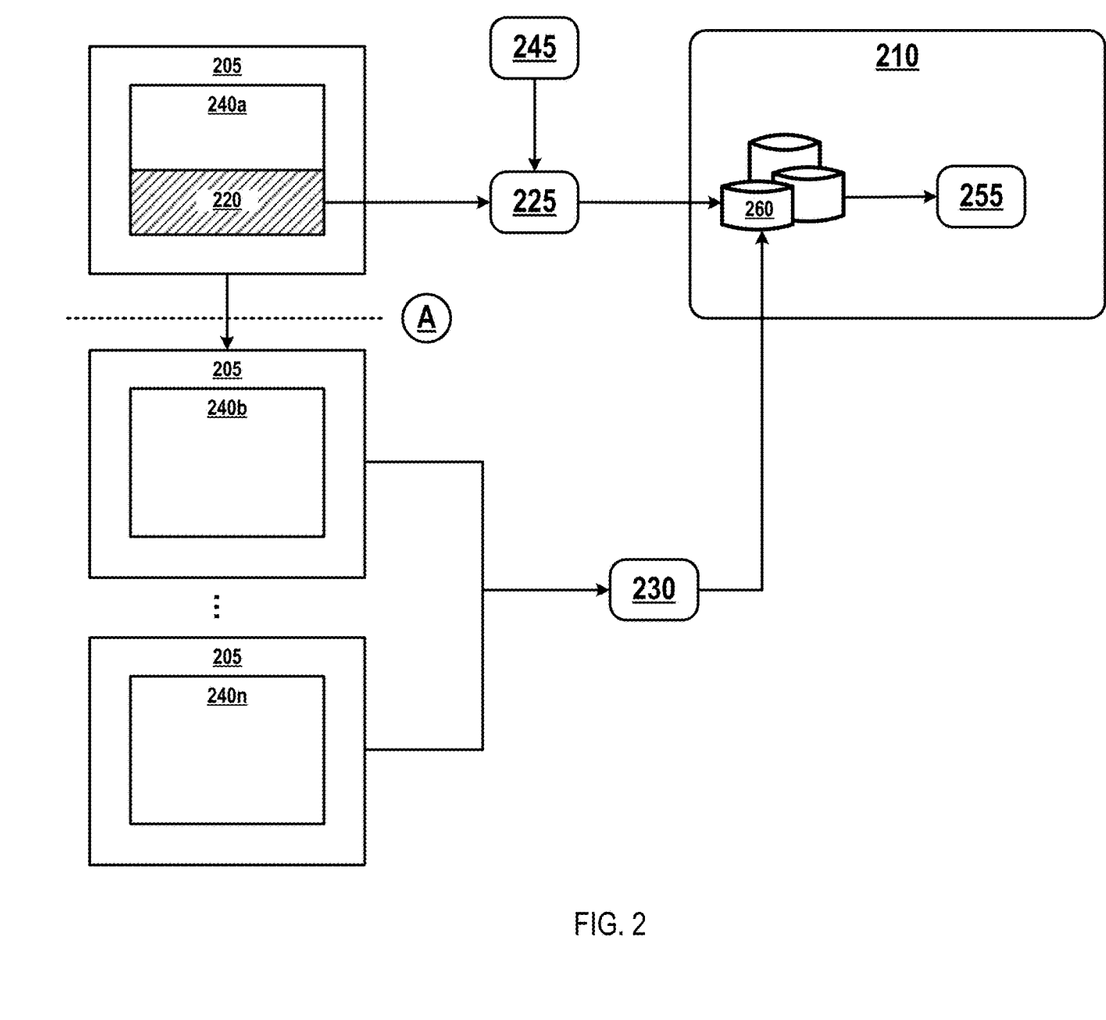
FIG. 2 depicts a flow diagram of presenting a promotional graphic at a content presentation device according to some embodiments.

FIG. 2 depicts a flow diagram of presenting a promotional graphic at a content presentation device according to some embodiments. As shown in FIG. 2, a content presentation device 205 may be presenting a primary content offering 240a. A content detection component, which may be or may include an ACR component, may detect which particular content 240a and/or which time point of the content is being presented via the content presentation device 205 ("content presentation information"). The content detection component may operate on a content presentation device 205 and/or a computing device associated or nearby a content presentation device (for instance, a smart phone adjacent to the content presentation device). A outcome management system 210 may receive graphic presentation information 225 responsive to a promotional graphic 220 being detected as being displayed on the content presentation device 205. The outcome management system 210 may access graphic information 245 associated with the promotional graphic 220 including, for instance, information relating to a program being promoted through the promotional graphic, broadcast time, frequency information, or the like. The management system 210 may store the graphic information 245 and/or the graphic presentation information 225 in a database 260.

After the content presentation device 205 has been exposed to the promotional graphic 220 (indicated by dashed line A), content offerings 240b-n and other activity by the content presentation device 205 may be obtained as post-presentation information 230. The post-presentation information 230 may be used by the management system 210, alone or in combination with other information, such as the graphic information 245, the graphic presentation information 225, and/or third-party information, to generate outcome information 255 indicating the outcome, effectiveness, or other results of the promotional graphic 220. In some embodiments, the promotion subject may be a product or service (i.e., a non-content promotion) and the post-presentation information 230 may include sales data or other information relating to the product or service promotion subject. For example, a product supplier may provide sales information relating to a product promoted using a promotional graphic 220 to the management system 210 to determine outcome information 255. In another example, a product supplier, advertiser, marketer, or the like may access the graphic information 245, the graphic presentation information 225 to use to determine the effectiveness of an advertising campaign for a product or service.

According to some embodiments, the outcome information 255 may be used to adapt a promotional campaign based on user interaction with the content. For example, the real-time or substantially real time information may indicate to a content originator associated with a campaign that users are responding more favorably to a first promotional graphic than a second promotional graphic. The content originator may modify the second promotional graphic to match certain characteristics of the first promotional graphic and/or increase the use of the first promotional graphic and decrease the use of the second promotional graphic.

Figure 3:
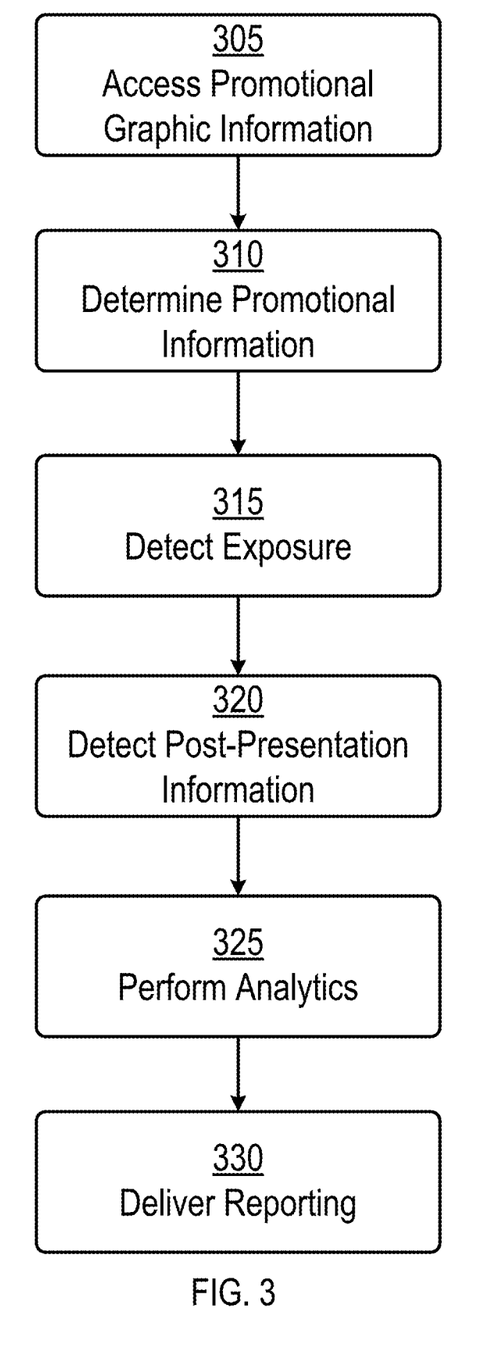
FIG. 3 depicts a flow diagram for an illustrative method of presenting a promotional graphic according to some embodiments.

FIG. 3 depicts a flow diagram for an illustrative method of presenting a promotional graphic according to some embodiments. Promotional graphic information may be accessed 305 by the content management system. For example, an integrated play-out system log file or other informational file may be loaded to extract relevant information, such as metadata, about a television program promotion graphic. The integrated play-out system log file may generate and/or include a record of all individual video and graphics that are composited to form part of a television network play-out stream The outcome management system may determine promotional or graphic information 310. For example, the management system may use relevant television program promotion graphics metadata to determine what program is being promoted, as well as where and when the exposure is scheduled to take place. For example, television program promotion graphic "A" that promotes program "X" is scheduled to air within program "Y" at "Z" minutes/seconds into the program with a scheduled duration of "N" minutes/seconds. The outcome management system may detect 315 exposure to a promotional graphic by a content presentation device. For instance, the outcome management system may use automated content recognition of the primary content offering (i.e., underlying program) associated with the timing of the promotional graphics relative to the related program timing on any individual enabled content presentation device. In some embodiments, although there may be latency between the television network play-out and a device viewing stream, the contextual timing of the television program promotion graphics may still relate to that of the primary content offering in which the graphic is featured. Post-presentation information may be detected 320. In some embodiments, the outcome management system and/or the service provider may detect post-presentation activity. In some embodiments, a content presentation device may monitor and detect post-presentation activity and may report or otherwise allow access to such information.

The outcome management system may perform 325 analytics using the outcome information, graphic information, graphic presentation information, and/or post-presentation information alone or in combination with various other data sources, such as third-party databases.

Analytics may be performed 325 relating to the promotional graphics and/or the consumption thereof or any resulting outcomes (i.e., change in viewership for a promoted content offering). In some embodiments, the outcome management system, a content originator, a service provider, an advertiser, and/or a marketer may conduct a series of analytics to provide context for the promotional graphics, assess the level of exposure and conversion to program viewing, and generate relevant report metrics. Such analytics may include how many devices were exposed to any given promotional graphic as well as those related to the same program promotion campaign, how many times and the related timing that each device was exposed to the promotional graphics associated with any given campaign, what proportion of the devices that detected viewing of the targeted promoted program were exposed to promotional graphics for the related program promotion campaign, as well as the corresponding program viewing conversion rates for various subsets of types, frequencies and timing of exposure to targeted on-screen graphics for the each program promotion campaign. Additional analytics may include a comparison of the relative effectiveness of using promotional graphics, for instance, relative to original promotional forms, for example, in terms of related impact on program viewing.

Reports relating to the promotional graphics and/or the analytics may be delivered 330, for example, to a content originator, an advertiser, a marketer, and/or a service provider. For instance, reports may be delivered via physical or electronic means the relevant reporting information associated with the program viewing or other marketing (for example, product sales) impact of the promotional graphics.

Figure 4:
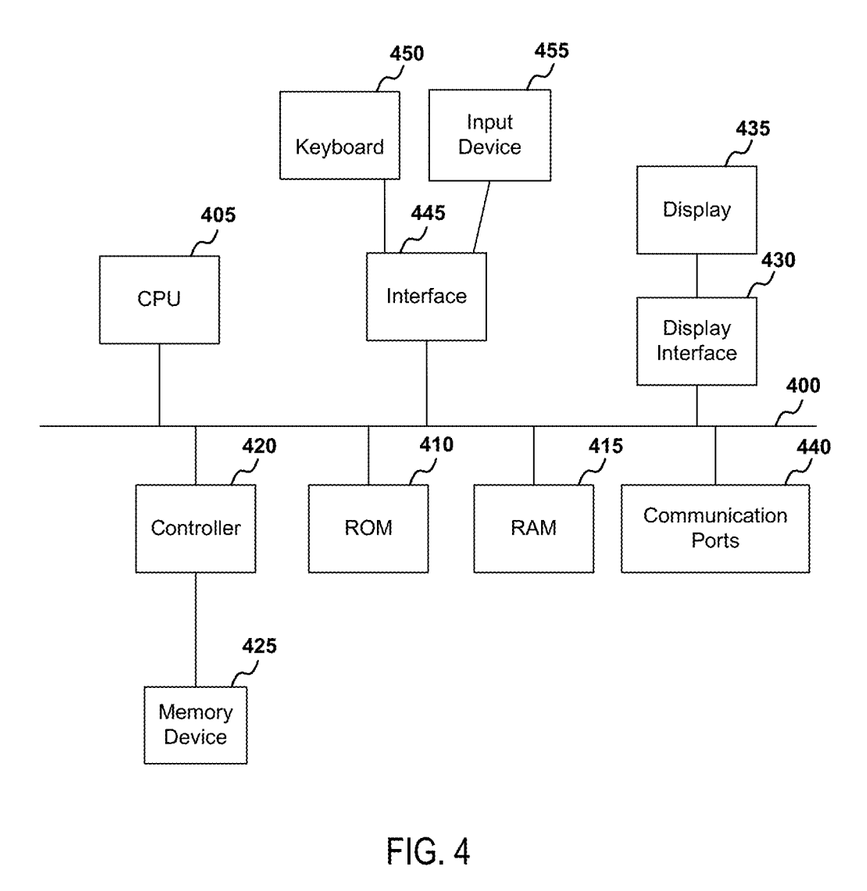
FIG. 4 depicts a block diagram of illustrative internal hardware that may be used to contain or implement program instructions according to an embodiment.

FIG. 4 depicts a block diagram of exemplary internal hardware that may be used to contain or implement program instructions, such as the modules and/or process steps discussed above in reference to FIGS. 1-3. A bus 400 serves as the main information highway interconnecting the other illustrated components of the hardware. CPU 405 is the central processing unit of the system, performing calculations and logic operations required to execute a program. CPU 405 is an exemplary processing device, computing device or processor as such terms are using in this disclosure. Read only memory (ROM) 410 and random access memory (RAM) 415 constitute exemplary memory devices.

A controller 420 interfaces with one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices.

Program instructions, software or interactive modules may be stored in the ROM 410 and/or the RAM 415. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 430 may permit information from the bus 400 to be displayed on the display 435 in audio, visual, graphic or alphanumeric format. Communication with external devices may occur using various communication ports 440. An exemplary communication port 440 may be attached to a communications network, such as the Internet or an intranet. Other exemplary communication ports 440 may comprise a serial port, a RS-232 port, and a RS-485 port.

The hardware may also include an interface 445 which allows for receipt of data from input devices such as a keyboard 450 or other input device 455 such as a mouse, a joystick, a touch screen, a remote control, a pointing device, a video input device, and/or an audio input device.

Computer program logic implementing all or part of the functionality previously described herein may be embodied in various forms, including, but in no way limited to, a source code form, a computer executable form, and various intermediate forms (for example, forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in a non-transitory form (for example, a source code form, a computer executable form, an intermediate form, or combinations thereof) in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink-wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

It will further be appreciated that the above-described methods and procedures may be provided using the systems disclosed herein, or on other types of systems. The methods and procedures, unless expressly limited, are not intended to be read to require particular actors or systems performing particular elements of the methods.

In the preceding specification, the present invention has been described with reference to specific example embodiments thereof. It will, however, be evident that various modifications and changes may be made thereunto without departing from the broader spirit and scope of the present invention. The description and drawings are accordingly to be regarded in an illustrative rather than restrictive sense.

What is claimed is:

1. A device comprising:
  one or more processors; and
  memory storing instructions that, when executed by the one or more processors, cause the device to:
    send, to a plurality of computing devices, first information to cause presentation of a plurality of on-screen graphics by the plurality of computing devices;
    receive second information indicating:
      that one or more on-screen graphics of the plurality of on-screen graphics were presented at the plurality of computing devices, wherein each of the one or more on-screen graphics promotes a content offering, and which content offerings, promoted by the one or more on-screen graphics, were presented at the plurality of computing devices following presentation of the one or more on-screen graphics; and generate, based on the second information, third information indicating which combination of on-screen graphics of the one or more on-screen graphics increased the promoted content offering presentations by the plurality of computing devices.

2. The device of claim 1, wherein the second information further indicates metadata indicative of at least one of: a type associated with the one or more on-screen graphics or a presentation time of the one or more on-screen graphics.

3. The device of claim 1, wherein the second information further comprises an identifier of each computing device of the plurality of computing devices that presented the content offerings, wherein the identifier is used to target a promotional campaign of a product or service to the plurality of computing devices.

4. The device of claim 1, wherein the plurality of computing devices comprises at least one of: a television, a smart television, a smartphone, a tablet computing device, a set-top-box, an electronic billboard, an electronic reader device, a gaming console, a portable gaming device, a computing device, or a phablet.

5. The device of claim 1, wherein the third information further indicates a relative effectiveness at increasing playback of the content offerings.

6. The device of claim 1, wherein the second information further comprises at least one of: a duration of consumption of the content offerings, a frequency of consumption of the content offerings, or a genre associated with the content offerings.

7. The device of claim 1, wherein the third information is generated based on execution of at least one machine learning algorithm.

8. A method comprising:
sending, to a plurality of computing devices, first information to cause presentation of a plurality of on-screen graphics by the plurality of computing devices;
receiving second information indicating:
that one or more on-screen graphics of the plurality of on-screen graphics were presented at the plurality of computing devices, wherein each of the one or more on-screen graphics promotes a content offering, and which content offerings, promoted by the one or more on-screen graphics, were presented at the plurality of computing devices following presentation of the one or more on-screen graphics; and
generating, based on the second information, third information indicating which combination of on-screen graphics of the one or more on-screen graphics increased the promoted content offering presentations by the plurality of computing devices.

9. The method of claim 8, wherein the second information further indicates metadata indicative of at least one of: a type associated with the one or more on-screen graphics or a presentation time of the one or more on-screen graphics.

10. The method of claim 8, wherein the second information further comprises an identifier of each computing device of the plurality of computing devices that presented the content offerings, wherein the identifier is used to target a promotional campaign of a product or service to the plurality computing devices.

11. The method of claim 8, wherein the plurality of computing devices comprises at least one of: a television, a smart television, a smartphone, a tablet computing device, a set-top-box, an electronic billboard, an electronic reader device, a gaming console, a portable gaming device, a computing device, or a phablet.

12. The method of claim 8, wherein the third information further indicates a relative effectiveness at increasing playback of the content offerings.

13. The method of claim 8, wherein the second information further comprises at least one of: a duration of consumption of the content offerings, frequency of consumption of the content offerings, or a genre associated with the content offerings.

14. The method of claim 8, wherein the third information is generated based on execution of at least one machine learning algorithm.

15. A non-transitory computer-readable storage medium storing computer-readable instructions that, when executed by a processor cause:
sending, to a plurality of computing devices, first information to cause presentation of a plurality of on-screen graphics by the plurality of computing devices;
receiving second information indicating:
that one or more on-screen graphics of the plurality of on-screen graphics were presented at the plurality of computing devices, wherein each of the one or more on-screen graphics promotes a content offering, and
whether content offerings, promoted by the one or more on-screen graphics, were presented at the plurality of computing devices following presentation of the one or more on-screen graphics; and
generating, based on the second information, third information indicating which combination of on-screen graphics of the one or more on-screen graphics increased the promoted content offering presentations by the plurality of computing devices.

16. The non-transitory computer-readable storage medium of claim 15, wherein the second information further indicates metadata indicative of at least one of: a type associated with the one or more on-screen graphics or a presentation time of the one or more on-screen graphics.

17. The non-transitory computer-readable storage medium of claim 15, wherein the second information further comprises an identifier of each computing device of the plurality of computing devices that presented the content offerings, wherein the identifier is used to target a promotional campaign of a product or service to the plurality of computing devices.

18. The non-transitory computer-readable storage medium of claim 15, wherein the third information further indicates a relative effectiveness at increasing playback of the content offerings.

19. The non-transitory computer-readable storage medium of claim 15, wherein the second information further comprises at least one of: a duration of consumption of the content offerings, frequency of consumption of the content offerings, or a genre associated with the content offerings.

20. The non-transitory computer-readable storage medium of claim 15, wherein the third information is generated based on execution of at least one machine learning algorithm.

* * * * *